United States Patent Office 2,911,358
Patented Nov. 3, 1959

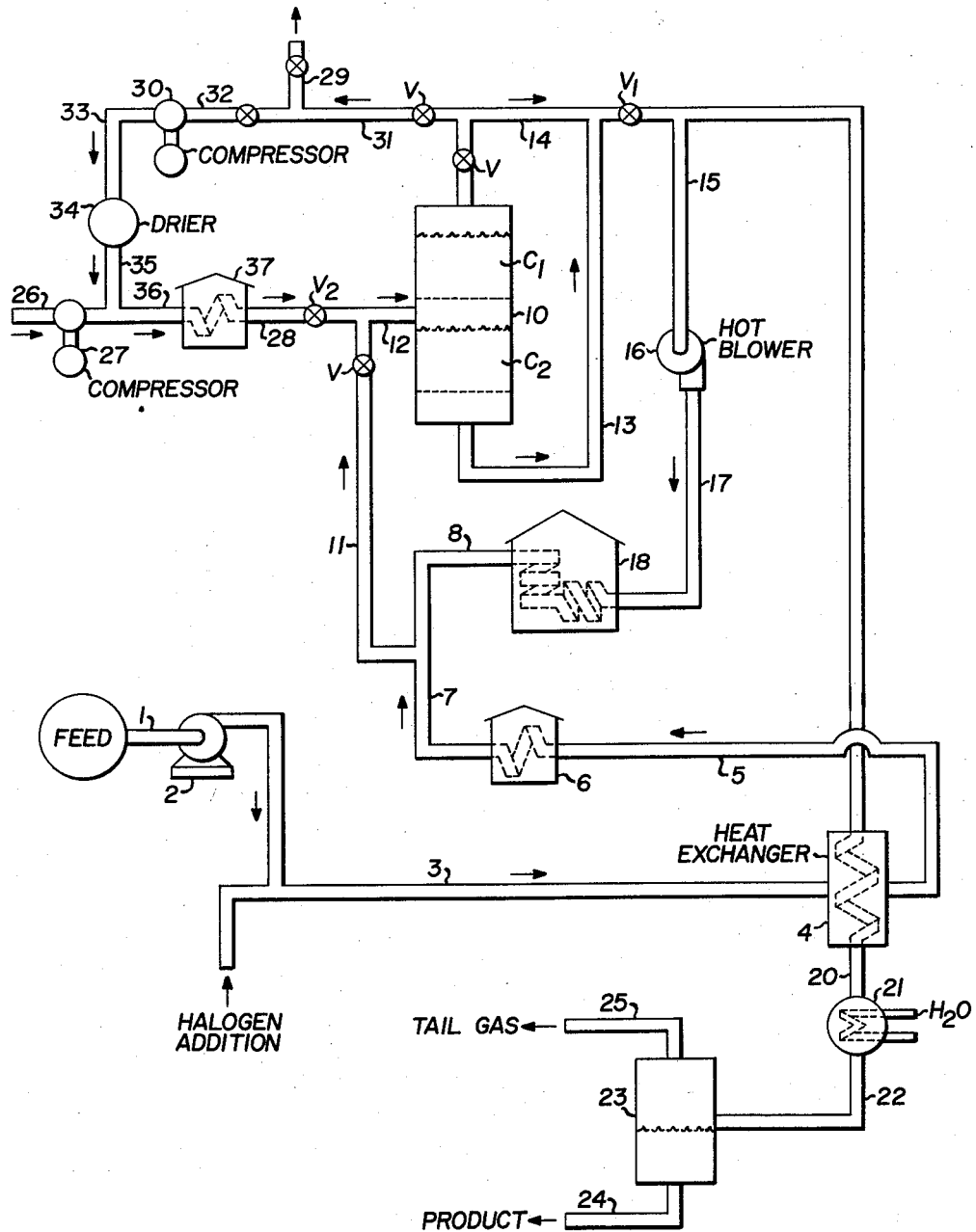

2,911,358

HYDROFORMING WITH RECYCLING OF PART OF THE PRODUCTS

Marjorie W. Leigh, Short Hills, Albert B. Welty, Jr., Westfield, Richard W. Sage, Fanwood, and Randolph M. Bailly, Little Silver, N.J., assignors to Esso Research and Engineering Company, a corporation of Delaware Application June 30, 1955, Serial No. 519,146

3 Claims. (Cl. 208—139)

The present invention relates to improvements in the hydroforming operation. More particularly, the present invention relates to improvements in supplying heat to the hydroforming process by means which are more economical, more effective, give an improved product and otherwise are more efficient.

The application of Charles E. Hemminger, Serial No. 367,631, filed July 13, 1953, describes and claims a method of recycling a portion of the hydroformed product to the reaction zone.

Hydroforming may be indicated or defined as a process for the catalytic conversion of feed stocks boiling in the naphtha boiling range to form products of improved octane rating by contacting the naphtha feed with a solid catalytic material in the presence of hydrogen at elevated temperature and pressure. As feed stock, virgin naphtha, cracked naphtha, Fischer naphtha, or a mixture of these may be employed. The catalysts employed are usually supported members of the platinum group metals or the V or VI group metal oxides also supported on a carrier. Specifically, the most commonly used catalysts are platinum carried on alumina and molybdenum oxide carried on alumina.

The present invention relates to hydroforming in the presence of platinum group metal catalysts.

As commonly described in the literature and practiced commercially, recycled hydrogen, that is, a hydrogen-containing gas obtained from a product recovery system is heated separately or in admixture with the feed and introduced into the reaction zone with the feed oil. In prior practice, this recycled gas was used to add the heat required for the endothermic reaction by heating the recycled gas from about 100°–150° F. to a temperature within the range of from about 1000°–1200° F. and recycling it in amounts of from about 2,000–10,000 standard cubic feet of gas per barrel of oil feed to the reaction zone. Aside from the fact that this recycled gas is associated with hydrocarbons which undergo thermal cracking during the heating of the gas to form carbonaceous deposits in the heating apparatus and the transfer lines, there is the further disadvantage that large furnace capacity is required because of the large quantities of gas thus recycled and the large amount of heat required to raise it to the stated temperatures. One of the important aspects of the present invention is to so operate the hydroforming process as to eliminate the necessity for recycling and reheating large quantities of relatively cold hydrogen-containing gas.

As practiced commercially, hydroforming employing a platinum catalyst is usually carried out in a plurality of separate reactors through which the oil passes in series and in which the oil is reheated between stages or reactors.

In brief compass, the present invention proposes carrying out a hydroforming process in the presence of a platinum group metal catalyst employing a single reactor and supplying heat to the reaction zone by recycling to the reaction zone a portion of the total reactor effluent reheated from the reactor outlet temperature to reactor inlet temperature, a difference of only about 100° F., the recycled material having the same composition as the reactor effluent. This procedure, therefore, permits the use of only one reactor since sufficient heat for reaction can be supplied with the recycled product to eliminate the necessity for intermediate reheat stages. This scheme also eliminates the necessity for separately heating and recycling hydrogen-containing gas, thus reducing the heat exchange area and compressor power required.

In order to accomplish these results, it is necessary to observe certain operating conditions and these include:

(1) Employing the regenerative hydroforming process wherein the catalyst is regenerated periodically, preferably, with an oxygen-containing gas;

(2) Employing as feed a naphtha which contains not more than 0.01% sulfur, desulfurizing the feed, if necessary, before hydroforming by known methods such as by treating the feed in the presence of hydrogen at elevated temperatures in the presence of a suitable catalyst, such as cobalt molybdate carried on alumina.

(3) Limiting the on-stream periods of the operation between regenerations of the catalyst to relatively short periods of time;

(4) Recycling a reheated portion of the hot effluent from the reactor;

(5) Operating with a high activity catalyst by providing means whereby a halogen such as chlorine is maintained on the catalyst.

These above specified conditions of operation, plus frequent regeneration of the catalyst, result in the provision of an integrated system which is adapted to provide important economies in the hydroforming process.

The object of the invention is to provide an improved method of hydroforming naphthas which results in effecting important economies in the hydroforming process.

Other and further objects of the invention will be apparent from the following more detailed description and claims.

In the accompanying drawing there is shown, diagrammatically an apparatus layout or system in which a preferred modification of the invention may be carried into effect.

Referring in detail to the drawing, a low sulfur naphtha feed is introduced into the system through line 1 and thence pumped by pump 2 into line 3 by means of which it is passed to a heat exchanger 4 wherein it passes therethrough in heat exchange relationship with hot product acquiring heat from said product whereupon the preheated feed is withdrawn from heat exchanger 4 through line 5 and charged to a heating means 6 where it is further heated and thence withdrawn through line 7 and charged to line 11 wherein it is mixed with a reheated portion of the effluent from furnace 18, such effluent being obtained from line 14 through line 15, through hot blower 16, line 17 and reheat furnace 18 and line 8. Fresh feed and recycled material thence pass via line 11, carrying valve V into line 12 and thence into reactor 10. Reactor 10 contains two separate bodies of catalyst, namely, $C_1$ and $C_2$ which are spaced apart as shown. The oil feed is injected into reactor 10 in the space between the beds $C_1$ and $C_2$. The advantage of so charging the feed in this manner is in the lower pressure drop across the reaction system reducing the hot blower horsepower requirements.

Under conditions more fully set forth hereinafter, the desired hydroforming reaction occurs and the reformed product is withdrawn from reactor 10 via lines 13 and 14. The hot stream flowing in lines 13 and 14 is in part passed without cooling via line 15 through a hot blower 16, a line 17 and a reheat furnace 18 into line 8 for recycling as previously indicated. The material in line 8 contains hydrogen as a result of the dehydrogenation reaction occurring in reactor 10, and this amount of hydrogen is sufficient to protect the catalyst against the deposition of inordinately large amounts of carbonaceous and other deactivating deposits on the catalyst. As previously stated, the heat content of this hot recycled product adds a very substantial portion of the heat necessary to support the endothermic reaction of hydroforming which occurs in reactor 10. The material in lines 13 and 14 which passes to product recovery passes through heat exchanger 4, thence passes via line 20 into a cooler 21 wherein it is cooled to a temperature sufficiently low to condense the normally liquid material, say, to a temperature of about 100° F., whereupon the cooled material is withdrawn from 21, through line 22, thence charged to a separator 23 from which the hydroformed crude liquid product may be withdrawn through line 24 and passed to conventional distillation and other purifying equipment to recover the desired product. Tail gas is withdrawn from separator 23, through line 25, and since this gas is rich in hydrogen, it will find use in the refinery in hydrodesulfurizing oil, in saturating olefins and other conventional refining processes.

There comes a time when the catalyst becomes contaminated with carbonaceous deposits under severe conditions of operation employed in the present improved process. Consequently, it is necessary to interrupt the on-stream hydroforming phase and to regenerate the catalyst. In so doing, the oil feed to the reactor 10 is discontinued and valve $V_1$ closed and the reactor depressured through line 29 and flushed with a CO and $CO_2$ free inert gas to drive off volatile carbonaceous material. The inert gas enters the system through line 26, is sufficiently compressed in 27 to give the desired flow rate through the system at a reasonable gas volume, about 100 p.s.i.g., and thence passes via line 36 to furnace 37, withdrawn via line 28 carrying control valve $V_2$ and charged to reactor 10. The flow of hot inert gas is continued until the gas withdrawn through line 29 is substantially free of hydrocarbons. At this point compressor 30 is commissioned for flue gas recycle through lines 32 and 33, drier 34, lines 35 and 36 and furnace 37 to reactor 10. Air is introduced through line 26 to compressor 27 and is mixed with the recycled inert gas in line 36 and passes to furnace 37, line 28 carrying valve $V_2$ through line 12 and into reactor 10, the concentration of oxygen in the mixture of air and recycled inert gas being about 2%. It is noted that normal refinery inert gas is not employed to purge the catalyst, for experience has shown that carbon dioxide is reduced in the presence of hydrogen and the platinum catalyst giving carbon monoxide, which poisons the platinum catalyst. Once the hydrogen is purged, the $CO_2$ bearing gases have relatively little poisoning action. The presence of oxygen in the regeneration gas causes carbonaceous and other deposits to be burned to form fumes which pass through lines 13 and 14 into valved line 31 and are purged from the system through valved line 29. A portion of the flue gas is recycled to maintain the low oxygen concentration desired. The flue gas recycled is dried to remove water which would strip the halogen from the catalyst. The burning of the carbonaceous deposits on the catalyst, of course, increases the temperature of the catalyst beds $C_1$ and $C_2$, but the oxygen concentration and gas inlet temperatures are carefully controlled so that the temperatures do not exceed 1050°–1100° F. After the carbon is substantially completely burned off as indicated by the temperature profile of the catalyst bed, the regeneration gas entering through line 28 is increased to substantially pure air, the flue gas recycle having been gradually decreased to 0 after the carbon has been burned off as previously mentioned. The flow of heated air is continued thereafter for a period of about 4 hours or until the catalyst is substantially restored in activity. Following the regeneration period, the catalyst is purged with an inert CO and $CO_2$ free gas to remove oxygen from the catalyst beds, whereupon a renewal of the on-stream period is begun by first feeding hydrogen-containing gas to reactor 10 until the inert gas, such as $N_2$ or scrubbed flue gas, has been substantially removed, and thereafter the oil feed is delivered to the reactor 10 and the on-stream period of hydroforming is renewed.

If, after a number of cycles, including the on-stream phase, the regeneration and the purges described above, the catalyst is not sufficiently restored to a high level of activity, this insufficiency may be corrected by treating the carbon-free catalyst with either pure oxygen or air at 100–400 pounds pressure at 1100°–1150° F. This treatment corrects abnormalities in the platinum crystal size or form so as to restore the activity of the catalyst by reducing the crystal size and causing the platinum particles to have a substantially amorphous form and an average crystal size of approximately 50 A. or less.

In order that the catalyst have a high level of activity, it is necessary to include a halogen in the catalyst composition. Since the halogen tends to be lost by the catalyst, it may be necessary to replenish the halogen by addition of carbon tetrachloride, HCl or any volatile organic chloride to the feed flowing in line 3, Fig. 1 as indicated, the amount of said chlorine being such as to maintain from about 0.1 to 2.0 wt. percent chlorine based on the total weight of the catalyst. Conventional means for halogen addition can be employed.

If product octane is a primary consideration, increasing the average halogen concentration on the catalyst either by higher addition rates during reaction cycles or by treating the catalyst after regeneration may be employed. The higher activity obtained in this manner reduces catalyst selectivity to liquid product, however, and requires corrosion protection for the unit.

To recapitulate, the present invention relates to a hydroforming operation carried out with a platinum group metal catalyst and involves as one of its chief features, the recycling to the reaction zone of a reheated portion of the total product, that is to say, recycling hot product of the same composition as the effluent from the hydroforming reactor which is delivered to product recovery. The process is further characterized in that it is of the regenerative type conducted at relatively low pressures and without the use of recycled gas from the product recovery system and limiting the on-stream period to from about 25–50 hours. Treatment of the catalyst with a halogen to maintain its activity, particularly, with respect to its hydrocracking activity and the production of a hydroformate of good volatility characteristics is also an important feature of the present invention.

The present process is adapted to produce a product having an octane rating as high as 95 research octane number (clear) in yields of the order of 82–83 volume percent $C_5$+ hydrocarbons based on feed.

The invention herein described has, as stated, many important features, principal of which is the utilization of the high heat carrying capacity of the reactor effluent in several important ways.

First: Because of the higher heat capacity of the reactor effluent as compared with conventional recycle gas, less has to be circulated to supply the same effective heat.

| Gas stream | B.t.u./s.c.f./°F. |
|---|---|
| Conventional recycle gas (91% $H_2$) | 0.023 |
| Reactor effluent (50% $H_2$) | 0.104 |

Second: Because the recycled stream goes through no heat exchange equipment and because only a small amount of heat must be added in the furnace to bring the recycle stream to the desired temperature, the circuit pressure drop is very low and the normally used and expensive recycle gas compressor can be replaced with the cheaper and lower capacity hot blower 16 shown in Fig. 1.

Third: The reactor effluent is at most only 100° F. below the desired temperature for reentering the reactor. This eliminates the necessity for reheating cold recycle gas obtained from the product recovery system which in turn means a substantial reduction in furnace requirements, heat exchangers, transfer lines, valving and the other accessory apparatus which are employed in conventional hydroforming plants.

Another important feature of the present invention is that, in its preferred modification, it involves a single hydroforming reactor. Of course, if it is desired to produce a hydroformate continuously, a second reactor may be included so that while the catalyst is undergoing regeneration in one reactor, the other reactor would be on-stream.

The present studies have revealed that practical operating conditions permitting the use of only recycled product in a single on-stream reactor system lie within a very narrow range. Furthermore, low sulfur in the feed is required for practical operation. The desired product quality, deactivation of the catalyst, and the time required for reactivation are determining factors which control the conditions. The conditions which were found to give good results are:

(1) A virgin naphtha which normally boils at from about 200°–350° F. and contains 30+ percent of naphthenes, the remainder paraffins and aromatics, and should contain less than 0.01 wgt. percent sulfur.

(2) Single adiabatic reactor.

Example

There is set forth below a specific example illustrating the preferred modification of the present invention:

| | |
|---|---|
| Louisiana virgin naphtha gravity, °API | 55.0 |
| Res. octane —C1 | 58.0 |
| Sulfur, wt. percent | 0.004 |
| Distillation: | |
| IBP, °F | 207 |
| 10% @ | 228 |
| 50% @ | 253 |
| 90% @ | 293 |
| FBP, °F | 327 |
| Composition, vol. percent: | |
| Paraffins | 44 |
| $C_7$ $C_6$ naph. | 28 |
| $C_7$ $C_5$ naph. | 13 |
| Aromatics | 15 |

Catalyst employed: Platinum on alumina. 0.6 wt. percent platinum with crystals below 50 A. on 100% eta alumina made by the alcoholate method. Chlorine on catalyst after chlorine treatment, about 1–2 wt. percent on catalyst.

| | |
|---|---|
| Cycle length on oil feed _____ hours | 35 |
| Unit pressure _____ p.s.i.g. | 300 |
| Feed rate _____ w./hr./w. | 2 |
| Product recycle _____ s.c.f./b. of feed | 11,000 |
| Hydrogen into reactor _____ mol. percent | 46 |
| Reactor inlet temperature, °F.: | |
| At start | 950 |
| At end | 965 |
| Reactor outlet temperature, °F.: | |
| Start | 866 |
| Finish | 895 |
| Total temperature drop, °F | 84–70 |
| Product obtained: | |
| $C_5+$ gasoline: Yield vol. percent on F.F. | 85.2 |
| Av. octane CFR–R C1 | 92.5 |
| Reid vapor pressure, lbs. | 4.2 |
| Distillation—D+L, vol. percent @: | |
| 158° F. | 4.5 |
| 257° F. | 49.5 |
| 356° F. | 98.0 |
| Butanes, vol. percent on F.F. | 5.0 |

It will be understood that the foregoing conditions of operation are merely illustrative and do not impose any limits on the invention. Thus, good results are secured by operating under the following conditions with feed stocks usually available to a refiner:

| | Range | Preferred |
|---|---|---|
| Feed rate, W./Hr./W. | 1–3 | |
| On-stream period | 25–50 | |
| Pressure, p.s.i.g. | 200–500 | |
| Preheat temperature, °F | 900–1,000 | 930–970 |
| Product recycle rate, standard cubic feet per barrel of oil feed | 8,000–14,000 | |
| Rate of activity loss octane numbers of product per 50 hours at constant temperature [1] | 1–13 | |

[1] Actual O.N. loss feed to 3 to 4 by gradually increasing preheat temperature during the cycle.

The most suitable naphtha would be one boiling in the range of from about 220°–350° F., which contained at least 30% naphthenes, the remainder being paraffins, aromatics and in some cases, olefins.

In the above example, it will be understood, of course, that these apply for best results to naphtha feed which contained 41% naphthenes and had a research octane number of 58. If there is a lesser amount of naphthenes in the feed, the hot product recycle rate may be somewhat lower since the lower the naphthene content of the oil, the lower the heat of reaction. The preheat supplied by the feed oil is a constant for a given reactor temperature drop during the passage of oil through the reactor. Consequently, the above table of conditions relate to the critical operating conditions for a specific naphtha feed oil, and the experienced operator will be guided by these illustrative conditions when processing a naphtha feed of higher or lower naphthene content than 41 volume percent in the feed and a research octane number higher or lower than 58.

The above table sets forth that the maximum preheat temperature should be about 965° F. with fresh catalyst and a good operating temperature would be around the range of 945°–950° F., and as the catalyst tended to deactivate under the severe conditions set forth in the above table, the temperature should be gradually increased so that at the end of, say, an on-stream period of about 50 hours, the octane number variation in the product can be held to 3–4 octane numbers. With respect to the pressure, of course, the lower the pressure, the higher the yields and the octane number of the product since catalyst activity and selectivity are both adversely affected by high hydrogen partial pressures. However, in order to protect the catalyst, pressures of about 200–300 p.s.i.g. are preferred with the ordinary feed stocks.

From the foregoing description, it is to be noted that all of the heat necessary to support the endothermic hydroforming reaction is obtained by heat interchange of the cold feed with hot product, further heating the feed oil in, say, a furnace or pipe still to a temperature not exceeding about 1000° F. and supplying the remainder of the heat necessary by recycling reheated hot total product to the reaction zone, the latter means supplying 70–90% of the total heat required. It is to be noted that recycle gas is not recovered from the product recovery system at a temperature of about 100° F. and heated to about 1200° F. as in the conventional process, thus achieving very substantial economies by the elimination of recycle gas reheating.

A mixed feed containing, say, virgin naphtha and cracked naphtha or naphtha obtained from coking of heavy oil can be used as a feed. The hydrogenation of the olefins present in the feed will, of course, add heat in situ and permit a reduction in the amount of heat added by preheating the oil in a furnace, by reheating the recycled product, and/or will permit a reduction in the rate at which hot product need be recycled to the hydroforming zone.

What is claimed is:

1. In a process of hydroforming a naphtha in a reaction zone containing a fixed bed of a catalyst which is a platinum group metal carried on alumina and containing a small amount of halogen, the improvement which comprises preheating a low sulfur naphtha stream to a temperature in the range of about 900° to 1000° F., passing the thus preheated naphtha stream to an inlet of said reaction zone from which hydrogen gas and naphtha vapors pass through said fixed bed of catalyst to an outlet of said reaction zone by which hydrogen gas and hydroformed naphtha product is removed as a hot vaporiform effluent, recycling a portion of said hot effluent uncooled at a sufficient recycle rate and temperature to said inlet of the reaction zone for mixing with the preheated naphtha feed stream to make the resulting hydrogen gas and naphtha vapor mixture have a tempertaure in the range of 900° to 1000° F. on entering the fixed bed of catalyst from said inlet and to maintain a temperature drop from said inlet to the outlet of less than 100° F., maintaining a pressure from about 200 to 500 p.s.i. in said reaction zone, contacting said vapor mixture with the catalyst for a period to effect desired conversion and recovering a hydroformed product of high octane rating and in good yields from a portion of the effluent of said reaction zone.

2. In the process of claim 1, said reaction zone containing two vertically spaced beds of the catalyst with the inlet at a point between said spaced beds so that the vapor mixture of preheated naphtha hydroforming feed mixed with the recycled hot effluent containing hydrogen and hydroformed products is passed from said inlet through each of said spaced beds to separate outlets.

3. The improvement in the process of claim 1 being further characterized by the temperature of the vapor mixture at the inlet being at a maximum of 965° F. and the temperature of effluent in the outlet being in the range of 866° to 895° F. so that the total temperature drop is in the range of about 70° to 84° F.

References Cited in the file of this patent

UNITED STATES PATENTS

| | | |
|---|---|---|
| 2,334,553 | Harding | Nov. 16, 1943 |
| 2,479,110 | Haensel | Aug. 16, 1949 |
| 2,642,384 | Cox | June 16, 1953 |
| 2,692,847 | Rex | Oct. 26, 1954 |
| 2,749,285 | Fritz | June 5, 1956 |
| 2,773,013 | Wolf et al. | Dec. 4, 1956 |